United States Patent

[11] 3,607,837

| [72] | Inventors | Sidney L. Reegen<br>Oak Park;<br>Bernard A. Merkl, Detroit, both of Mich. |
|---|---|---|
| [21] | Appl. No. | 775,130 |
| [22] | Filed | Nov. 12, 1968 |
| [45] | Patented | Sept. 21, 1971 |
| [73] | Assignee | BASF Wyandotte Corporation<br>Wyandotte, Mich. |

[54] WATER-SOLUBLE URETHANE-UREA POLYMERS PREPARED BY MELT POLYMERIZATION
11 Claims, No Drawings

[52] U.S. Cl. ................................................. 260/77.5 AM,
260/18 TN, 260/77.5 AA
[51] Int. Cl. ................................................. C08g 22/00
[50] Field of Search ....................................... 260/77.5
AA, 77.5 AM, 77.5 AP, 29.2 TN

[56] References Cited
UNITED STATES PATENTS
3,294,724  12/1966  Axelrood...................... 260/29.2

*Primary Examiner*—Donald E. Czaja
*Assistant Examiner*—M. J. Welsh
*Attorneys*—Charles G. Lamb, Cedric H. Kuhn, Robert E. Dunn, Bernhard R. Swick and Joseph D. Michaels ABSTRACT: Water-soluble urethane-urea polymers are prepared by the reaction of polyoxyalkylene glycols or copolymers of polyoxyalkylene glycols or blends thereof with an excess of organic polyisocyanates to form an isocyanate-terminated prepolymer, partially curing the prepolymer by exposing it to atmospheric moisture, and then chain-extending with a diamine. The reactions are carried out in the absence of a solvent.

WATER-SOLUBLE URETHANE-UREA POLYMERS PREPARED BY MELT POLYMERIZATION

This invention relates to the preparation of urethane-urea polymers. It is more particularly concerned with the preparation of urethane-urea polymers which are water soluble.

It is known in the art to prepare urethane-urea polymers by the technique known as "melt polymerization." According to this technique, reactive materials are reacted in the liquid phase by heating them up to and above their respective melting points. The prior art teaches the preparation of water-insoluble polymers by melt polymerization from the reaction of polyoxyalkylene glycols with organic polyisocyanates and then chain-extending with a diamine in the absence of a solvent. The resulting polymers are useful in the preparation of elastomers, thermoplastics, sealants, coatings, etc.

It is an object of this invention to prepare urethane-urea polymers. It is an additional object to provide a process for preparing water-soluble urethane-urea polymers. It is a further object to provide a urethane-urea polymer in the absence of a solvent. Other objects and advantages of this invention will become apparent to those skilled in the art upon consideration of the accompanying disclosure.

According to the present invention, water-soluble urethane-urea polymers are prepared by reacting a water-soluble polyoxyalkylene glycol or blends thereof with a stoichiometric excess of an organic polyisocyanate in the absence of a solvent. The reaction is preferably carried out in the presence of a catalyst. However, it is to be understood that the reaction can be conducted in the absence of a catalyst. The resulting product, which is a water-soluble isocyanate-terminated prepolymer, is then subjected to curing conditions wherein it becomes water-insoluble. The water-insoluble material is then reacted with a diamine to form a water-soluble urethane-urea polymer. In preparing polyurethanes according to this invention, the ratio of the reactive ingredients and the curing conditions of the prepolymer have to be closely controlled. In preparing the isocyanate-terminated prepolymer, it has been found that the ratio of OH/NCO must be between 1.0:1.2 and 1.0:2.1 and preferably between 1:1.4 and 1:1.9. At ratios greater than 1.0:1.2, the resulting polyurethanes are extremely susceptible to moisture and will completely solubilize under normal atmospheric conditions. At ratios less than 1.0:2.1, the resulting polyurethanes will be water-insoluble. In chain-extending the partially cured isocyanate-terminated prepolymer, it has been found that the ratio of $NCO/NH_2$ must be between 1.0:0.2 and 1.0:2.0 and preferably between 1.0:0.5 and 1.0:1.5. When ratios of $NCO/NH_2$ are greater than 1.0:0.2, water-insoluble polyurethanes result whereas extremely weak polyurethanes are produced if the ratio of $NCO/NH_2$ is less than 1.0:2.0.

In order to prepare the polyurethanes of this invention, it is also necessary that the isocyanate-terminated prepolymer be partially cured prior to chain-extending with diamines. It has been found that the more suitable prepolymers are water-insoluble before being reacted with diamines. This is accomplished by curing until at least 20 percent and up to about 70 percent of the free isocyanate groups of the prepolymer have been reacted. The curing is advantageously accomplished by merely exposing the prepolymer to normal atmospheric conditions. For example, if the free isocyanate of the prepolymer is 1.00 percent, then it should be cured in the atmosphere until the free isocyanate is below about 0.80 percent. If the free isocyanate concentration is not decreased by at least about 20 percent of its original concentration, then the resulting prepolymer will still be water-soluble and upon reacting with diamines, the resulting polymer is extremely weak.

As stated above, physical properties of the products of the present invention have been found to be directly related to the method of curing. By leaving the isocyanate-terminated prepolymer exposed to normal atmospheric conditions, a slow reaction of the isocyanate groups with water occurs because of the small amount of water available for reaction. It is believed that this slow reaction results in the formation of biuret linkages in the prepolymer as well as the normally expected urea linkages. It is further believed that when the prepolymer, containing the biuret groups, is mixed with a diamine and heated to melting, the diamine reacts with both the unreacted isocyanate groups and the biuret groups. The result is a water-soluble urethane-urea polymer.

The polyoxyalkylene glycols which may be used in this invention are those which are water-soluble. These glycols are generally prepared by the condensation of alkylene oxides, such as ethylene or propylene oxide or a blend of these oxides, with a difunctional initiator, such as water or a glycol, such as ethylene or propylene glycol. The resulting glycol is then chain-extended. Polyoxyethylene glycol is preferred since it is hydrophilic even at molecular weights as high as 1 million to 5 million. Polyoxypropylene glycols may also be employed. The molecular weight of the polyoxyalkylene glycol should be at least 1,000 and preferably 3,000 to 12,000 and more.

Any suitable organic polyisocyanate may be used in practicing this invention. These include aromatic, aliphatic, and cycloaliphatic diisocyanates and combinations thereof. Examples of the more common diisocyanates are toluene diisocyanate, tetramethylene diisocyanate, 4,4'-diphenyl methane diisocyanate, 1,5-naphthalene diisocyanate, m-xylylene diisocyanate, and methyl cyclohexane diisocyanate. Other representative organic diisocyanates include polyisocyanates disclosed in U.S. Pat. Nos. 2,292,443; 2,683,730; and 2,929,794. Mixtures of two or more of any of the organic polyisocyanates may be employed.

The diamines which may be used in the practice of this invention may be either primary or secondary diamines or combinations thereof. One type of diamine which may be used in the practice of this invention is represented by the general formula:

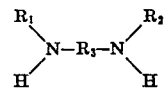

wherein $R_1$ and $R_2$ are alkyl groups, cycloalkyl groups, aryl groups, hydroxyalkyl groups, cyanoalkyl groups, or hydrogen. $R_3$ is either an alkyl group, cycloalkyl group, an aryl group, or it may be omitted altogether in which case the nitrogens are linked together. Examples of these diamines are ethylene diamine, N-(2-hydroxyproply) ethylene diamine, N,N-(biscyanoethyl) ethylene diamine, and the like. Cyclic diamines, such as, for example, 2-methylpiperazine, benzopiperazine, 2,6-dimethylpiperazine, and the like, may also be used.

Carbamates of diamines may also be used in the practice of this invention. They are generally prepared by the reaction of carbon dioxide or a compound which liberates carbon dioxide with a diamine containing two amino-nitrogens. Any of the diamines disclosed above may be used. A preferred diamine carbamate is 2-methylpiperazine carbamate.

Substantially any of the prior art catalysts may be employed in preparing the isocyanate-terminated prepolymer. These include, for example, organic tin compounds and tertiary amines. Suitable organic tin compounds that may be used are those tin compounds having a tin to oxygen to carbon valence bond or a direct carbon to tin valence bond and at least one catalytically intensifying bond from the tin to halogen, oxygen, sulfur, nitrogen, or phosphorus. A preferred organic tin compound is stannous octoate. For a more comprehensive understanding of the organic tin compounds that may be utilized, the disclosure thereof in U.S. Pat. No. 3,194,773 is herewith incorporated by reference. Examples of tertiary amines that may be used are N-methyl morpholine, trimethylamine, ethyl diethanolamine, tetramethylethylene diamine, dimethyl amino-propane, diethyl ethanolamine, and the like.

In a preferred embodiment of this invention, one mole of a polyoxyalkylene glycol is mixed with from about 1.1 to 2.2 moles of an organic polyisocyanate, preferably a cycloaliphatic polyisocyanate, in the presence of a catalyst in the range of from about 0.0001 to 0.1 weight percent of glycol at from about 40° to 100° C. for about 0.01 to 1.5 hours. The free isocyanate concentration of the mix after this period will be from about 0.1 to 1.5 percent by weight of the prepolymer. The reaction mixture is then left to cool to room temperature and then ground to a fine powder. The powder is left exposed to the atmosphere for at least 12 hours at 40° to 110° F. and a relative humidity of 20 to 90 percent. At this point the isocyanate-terminated prepolymer is solid and water-insoluble. One equivalent of the isocyanate-terminated prepolymer is then mixed with from about 0.2 to 2.0 equivalents of a diamine. The diamine that is used is one that has a melting point below the temperature of the mix. The isocyanate-terminated prepolymer and the diamine are then mixed for about 1 to 5 minutes at about 65° to 180° C. The resulting mixture is then allowed to cool to room temperature. The resulting polymer is water-soluble.

In the preferred embodiment, a cycloaliphatic polyisocyanate is the preferred organic polyisocyanate. It has been found that the resulting polymer, when exposed to conditions of high humidity, has higher tensile strengths than those polymers prepared from aromatic polyisocyanates. This property becomes particularly important when the polymer is used as a size since the sizing operation is usually conducted under condition of high humidity.

The following examples will illustrate the practice of this invention, but are not to be considered as being unduly limitative thereof.

EXAMPLE I

This example illustrates the preparation of an isocyanate-terminated prepolymer.

3,039 grams of a polyoxyethylene glycol of 6,078 molecular weight were melted and poured into a flask equipped with a mechanical stirrer and an outlet tube connected to a vacuum pump. The system was heated for two hours at 110° to 115° C. with stirring and pulling a vacuum to remove moisture. Nitrogen was then fed into the flask to release the vacuum. 0.6 gram of stannous octoate was added. The temperature of the mixture was adjusted to 75° C., and then 139 grams of toluene diisocyanate were added. The ratio of NCO/OH in the mixture was 1.6/1. The temperature was maintained at between 70° and 80° C. for 0.5 hour, at which time the NCO concentration was 0.76 percent.

Within six hours after the preparation of the isocyanate-terminated prepolymer, the prepolymer was ground to a fine particle size and allowed to age at 75° F. and 55 percent relative humidity for two days. The partially cured prepolymer was found to be water-insoluble and had an NCO concentration of 0.41 percent.

EXAMPLE II

This example illustrates the preparation of a urethane-urea polymer prepared from the isocyanate-terminated prepolymer of example I.

The prepolymer of example I was mixed in an extruder with 2-methylpiperazine. The amount of 2-methylpiperazine used was 0.4 percent by weight of the prepolymer. This mixture was extruded at a temperature of 120° to 140° C. The residence time in the extruder was 2 to 3 minutes. The polymer that was obtained was water-soluble and formed films that had a tensile strength of 5,412 p.s.i. and a break elongation of 951 percent.

When maintained for 5 days at 72° F. and 75 percent relative humidity, the film had a tensile strength of 1,490 p.s.i.

EXAMPLE III

This example illustrates the preparation of a urethane-urea polymer prepared from the isocyanate-terminated prepolymer of example I.

The prepolymer of example I was mixed in a extruder with 2-methylpiperazine carbamate. The amount of 2-methylpiperazine carbamate used was 0.15 percent by weight of the prepolymer. This mixture was extruded at a temperature of 120° to 14° C. The residence time in the extruder was 2 to 3 minutes. The polymer that was obtained was water-soluble and formed films that had a tensile strength of 6,700 p.s.i. and a break elongation of 920 percent.

When maintained for 2 days at 75° F. and 75 percent relative humidity, the film was found to have a tensile strength of 1,200 p.s.i.

EXAMPLE IV

This example illustrates the preparation of a urethane-urea polymer prepared from the isocyanate-terminated prepolymer of example I.

The prepolymer of example I was mixed in an extruder with 2-methylpiperazine. The amount of 2-methylpiperazine used was 0.55 percent by weight of the prepolymer. This mixture was extruded at a temperature of 120° to 140° C. The residence time in the extruder was 2 to 3 minutes. The polymer that was obtained was water-soluble and formed films that had a tensile strength of 4,700 p.s.i. and a break elongation of 864 percent.

When maintained for 2 days at 75° F. and 75 percent relative humidity, the film was found to have a tensile strength of 1,100 p.s.i.

EXAMPLE V

This example illustrates the preparation of a urethane-urea polymer prepared from the isocyanate-terminated prepolymer of example I.

The prepolymer of example I was mixed in an extruder with 2-methylpiperazine. The amount of 2-methylpiperazine used was 0.30 percent by weight of the prepolymer. This mixture was extruded at a temperature of 120° to 140° C. The residence time in the extruder was 2 to 3 minutes. The polymer that was obtained was water-soluble and formed films that had a tensile strength of 5,600 p.s.i. and a break elongation of 949 percent.

When maintained for 2 days at 75° F. and 75 percent relative humidity, the film was found to have a tensile strength of 1,600 p.s.i.

EXAMPLE VI

This example illustrates the preparation of a urethane-urea polymer.

3,039 grams of a polyoxyethylene glycol of 6,078 molecular weight were melted and poured into a flask equipped with a mechanical stirrer and an outlet tube connected to a vacuum pump. The system was heated for 2 hours at 110° to 115° C. with stirring and pulling a vacuum to remove moisture. Nitrogen was then fed into the flask to release the vacuum. 0.6 gram of stannous octoate was added. The temperature of the mixture was adjusted to 75° C., and then 121 grams of toluene diisocyanate were added. The ratio of NCO/OH in the mixture was 1.4/1. The temperature was maintained at between 70° to 80° C. for 0.5 hour, at which time the NCO concentration was 0.56 percent.

Within 6 hours after the preparation of the isocyanate-terminated prepolymer, the prepolymer was ground to a fine particle size and allowed to age at 75° F. and 55 percent relative humidity for 3 days. The partially cured prepolymer was found to be water-insoluble and had an NCO concentration of 0.24 percent. This prepolymer was then mixed in an extruder with 2methylpiperazine. The amount of 2-methylpiperazine used was 0.25 percent by weight of the prepolymer. This mixture was extruded at a temperature of 115° to 130° C. The residence time in the extruder was 2 to 3 minutes. The polymer that was obtained was water-soluble and formed films that had a tensile strength of 3,214 p.s.i. and a break elongation of 707 percent.

When maintained for 2 days at 75° F. and 75 percent relative humidity, the film was found to have a tensile strength of 1,012 p.s.i.

EXAMPLE VII

This example illustrates the preparation of a urethane-urea polymer.

3,039 grams of a polyoxyethylene glycol of 6,078 molecular weight are melted and poured into a flask equipped with a mechanical stirrer and an outlet tube connected to a vacuum pump. The system is heated for 2 hours at 110° to 115° C. with stirring and pulling a vacuum to remove moisture. Nitrogen is then fed into the flask to release the vacuum. 0.4 grams of triethylamine is added. The temperature of the mixture is adjusted to 75° C., and then 96 grams of toluene diisocyanate are added. The ratio of NCO/OH in the mixture is 1.1/1. The temperature is maintained at between 70° to 80° C. for 0.5 hours, at which time the NCO concentration is 0.09 percent.

Within 6 hours after the preparation of the isocyanate-terminated prepolymer, the prepolymer is ground to a fine particle size and allowed to age at 75° F. and 55 percent relative humidity for 3 days. The partially cured prepolymer is found to be water-insoluble and has an NCO concentration of 0.06 percent. This prepolymer is then mixed in an extruder with hexamethylene diamine. The amount of hexamethylene diamine used is 0.05 percent by weight of the prepolymer. This mixture is extruded at a temperature of 115° to 130° C. The residence time in the extruder is 2 to 3 minutes. The polymer that is obtained is water-soluble and forms films that have tensile strengths and break elongations comparable to the films described in the preceding examples.

EXAMPLE VIII

This example illustrates the preparation of a urethane-urea polymer.

3,039 grams of a polyoxyethylene glycol of 6,078 molecular weight are melted and poured into a flask equipped with a mechanical stirrer and an outlet tube connected to a vacuum pump. The system is heated for two hours at 110° to 115° C. with stirring and pulling a vacuum to remove moisture. Nitrogen is then fed into the flask to release the vacuum. 0.6 gram of dibutyltin dilaurate is added. The temperature of the mixture is adjusted to 75° C., and then 183 grams of toluene diisocyanate are added. The ratio of NCO/OH in the mixture is 2.1/1. The temperature is maintained at between 70° and 80° C. for 0.5 hour, at which time the NCO concentration is 1.41 percent.

Within 6 hours after the preparation of the isocyanate-terminated prepolymer, the prepolymer is ground to a fine particle size and allowed to age at 75° F. and 55 percent relative humidity for 3 days. The partially cured prepolymer is found to be water-insoluble and has an NCO concentration of 0.66 percent. This prepolymer is then mixed in an extruder with hexamethylene diamine carbamate. The amount of hexamethylene diamine carbamate used is 0.75 percent by weight of the prepolymer. This mixture is extruded at a temperature of 115° to 130° C. The residence time in the extruder is 2 to 3 minutes. The polymer that is obtained is water-soluble and forms films that have tensile strengths and break elongations comparable to the films described in the preceding examples.

When maintained for 2 days at 75° F. and 75 percent relative humidity, the film is found to have a tensile strength of approximately the same as the tensile strength of example V when maintained under similar conditions.

EXAMPLE IX

This example illustrates the preparation of a urethane-urea polymer prepared from an isocyanate-terminated prepolymer. The polymer was prepared from an uncured prepolymer rather than from a partially cured prepolymer as used in the practice of the present invention.

3,039 grams of a polyoxyethylene glycol of 6,078 molecular weight was melted and poured into a flask equipped with a mechanical stirrer and an outlet tube connected to a vacuum pump. The system was heated for 2 hours at 110° to 115° C. with stirring and pulling a vacuum to remove moisture. Nitrogen was then fed into the flask to release the vacuum. 0.6 gram of stannous octoate was added. The temperature of the mixture was adjusted to 75° C., and then 183 grams of toluene diisocyanate were added. The ratio of NCO/OH in the mixture was 2.1/1. The temperature was maintained at between 70° and 80° C. for 0.5 hour, at which time the NCO concentration was 1.69 percent.

The isocyanate-terminated prepolymer was ground to a fine particle size and mixed in an extruder with 2-methylpiperazine. The amount of 2-methylpiperazine used was 0.4 percent by weight of the prepolymer. This mixture was extruded at a temperature of 85° to 90° C. The residence time in the extruder was 2 to 3 minutes. The polymer that resulted was water-soluble, extremely weak, and brittle, and had a tensile strength of less than 300 p.s.i.

EXAMPLE X

This example illustrates the preparation of a urethane-urea polymer.

1,000 grams of a polyoxyethylene glycol of 6.078 molecular weight were melted and poured into a flask equipped with a mechanical stirrer and an outlet tube connected to a vacuum pump. The system was heated for 2 hours at 110° to 115° C. with stirring and pulling a vacuum to remove moisture. Nitrogen was then fed into the flask to release the vacuum. 0.1 gram of stannous octoate was added. The temperature of the mixture was adjusted to 75° C., and then 54.4 grams of methyl cyclohexane diisocyanate were added. The ratio of NCO/OH in the mixture was 1.75. The temperature was maintained at 70° and 80° C. for 0.5 hour, at which time the NCO concentration was 0.97 percent.

Within 6 hours after the preparation of the isocyante-terminated prepolymer, the prepolymer was ground to a fine particle size and allowed to age at 75° F. and 55 percent relative humidity for 15 days. The partially cured prepolymer was found to be water-insoluble and had a NCO concentration of 0.66 percent. This prepolymer was then mixed in an extruder with 2-methylpiperazine. The amount of 2-methylpiperazine used was 0.75 percent by weight of the prepolymer. This mixture was extruded at a temperature of 115° to 130° C. The residence time in the extruder was 2 to 3 minutes. The polymer that resulted was water-soluble and formed films that had a tensile strength of about 4,300 p.s.i. and a break elongation of about 720 percent.

One film sample, maintained for 2 days at 75° F. and 75 percent relative humidity, was found to have a tensile strength of approximately 4,300 p.s.i. and an elongation at break of 760 percent. A second film sample, maintained for 2 days at 75° F. and 85 percent relative humidity, was found to have a tensile strength of 2,750 p.s.i. and an elongation at break of 900 percent.

EXAMPLE XI

This example illustrates the preparation of a urethane-urea polymer.

1,000 grams of a polyoxyethylene glycol of 6,078 molecular weight were melted and poured into a flask equipped with a mechanical stirrer and an outlet tube connected to a vacuum pump. The system was heated for 2 hours at 110° to 115° C. with stirring and pulling a vacuum to remove moisture. Nitrogen was then fed into the flask to release the vacuum. 0.1 gram of stannous octoate was added. The temperature of the mixture was adjusted to 75° C., and then 67.0 grams of 4,4' methylene diphenylene diisocyanate were added. The ratio of NCO/OH in the mixture was 1.6. The temperature was maintained at between 70° and 80° C. for 0.5 hour, at which time the NCO concentration was 0.62 percent.

Within 6 hours after the preparation of the isocyanate-terminated prepolymer, the prepolymer was ground to a fine particle size and allowed to age at 75° F. and 55 percent relative humidity for 3 days. The partially cured prepolymer was found to be water-insoluble and had a NCO concentration of 0.40 percent. This prepolymer was then mixed in an extruder with 2-methylpiperazine carbamate. The amount of 2-methylpiperazine carbamate used was 1.00 percent by weight of the prepolymer. This mixture was extruded at a temperature of 115° to 130° C. The residence time in the extruder was 2 to 3 minutes. The polymer that resulted was water-soluble and formed films that had a tensile strength of about 4,500 p.s.i. and a break elongation of about 920 percent.

When maintained for 2 days at 75° F. and 75 percent relative humidity, the film was found to have a tensile strength of approximately 900 p.s.i.

EXAMPLE XII

This example illustrates the preparation of a urethane-urea polymer.

1,000 grams of a polyoxyethylene glycol of 6,078 molecular weight were melted and poured into a flask equipped with a mechanical stirrer and an outlet tube connected to a vacuum pump. The system was heated for 2 hours at 110° to 115° C. with stirring and pulling a vacuum to remove moisture. Nitrogen was then fed into the flask to release the vacuum. 0.1 gram of stannous octoate was added. The temperature of the mixture was adjusted to 75° C., and then 55.1 grams of m-xylylene diisocyanate were added. The ratio of NCO/OH in the mixture was 1.75/1. The temperature was maintained at between 70° and 80° C. for 0.5 hour, at which time the NCO concentration was 0.73 percent.

Within 6 hours after the preparation of the isocyanate-terminated prepolymer, the prepolymer was ground to a fine particle size and allowed to age at 75° F. and 100 percent relative humidity for 2 days. The partially cured prepolymer was found to be water-insoluble and had an NCO concentration of 0.50 percent. This polymer was then mixed in an extruder with 2-methylpiperazine carbamate. The amount of 2-methylpiperazine carbamate used was 0.75 percent by weight of the prepolymer. This mixture was extruded at a temperature of 115° to 130° C. The residence time in the extruder was 2 to 3 minutes. The polymer that resulted was water-soluble and formed films that had a tensile strength of about 4,900 p.s.i. and a break elongation of about 1,000 percent.

When maintained for 2 days at 75° F. and 85 percent relative humidity, the film was found to have a tensile strength of approximately 2,100 p.s.i. and an elongation at break of 800 percent.

We claim:

1. A melt polymerization process for forming a water-soluble urethane-urea polymer consisting essentially of the steps of:
   a. mixing at a temperature of from about 40° C. to 100° C. a water-soluble polyoxyalkylene glycol with an organic polyisocyanate in an OH/NCO ratio of from 1.0:1.2 to 1.0:2.1 to form an isocyanate-terminated prepolymer; b. subjecting the resulting isocyanate-terminated prepolymer to curing conditions by contacting the prepolymer with an atmosphere having a relative humidity of about 20 to 90 percent at a temperature in the range of about 40° to 110° F. such that the prepolymer is partially cured; and
   c. mixing the partially cured prepolymer with a diamine or diamine carbamate in a ratio of isocyanate groups in the partially cured prepolymer to amine groups in the diamine or diamine carbamate ranging from about 1.0:0.2 to 1.0:2.0, such that the prepolymer is chain-extended thereby.

2. The process of claim 1 wherein the polyoxyalkylene glycol has a molecular weight of from about 3,000 to 12,000.

3. The process of claim 1 wherein the organic polyisocyanate is toluene diisocyanate, tetramethylene diisocyanate, 4,4-diphenyl-methane diisocyanate, 1,5-naphthalene diisocyanate, m-xylylene diisocyanate, or methyl cyclohexane diisocyanate.

4. The process of claim 1 wherein the diamine is ethylene diamine or 2-methylpiperazine.

5. The process of claim 1 wherein the diamine carbamate is ethylene diamine carbamate or 2-methylpiperazine carbamate.

6. The process of claim 1 wherein the mixture of polyoxyalkylene glycol to organic polyisocyanate is such that the ratio of hydroxyl groups to isocyanate groups is from 1:1.4 to 1:1.9; the partially cured isocyanate-termiated prepolymer is the reaction product of an uncured isocyanate-terminated prepolymer and water from the atmosphere with the ratio of water to isocyanate groups being an amount sufficient to react with from about 20 percent of the free isocyanate groups of the uncured prepolymer to about 70 percent of the free isocyanate groups of the uncured prepolymer; and the ratio of isocyanate groups in said partially cured prepolymer to amine groups in said diamine is from 1.0:05 to 1.0:1.5.

7. The process of claim 1 wherein said polyoxyalkylene glycol is mixed with said organic polyisocyanate for a period of from about 0.01 to 1.5 hours.

8. The process of claim 1 wherein said isocyanate-terminated prepolymer is partially cured by contacting the prepolymer with the atmosphere for a period of at least 12 hours.

9. The process of claim 1 wherein the mixing of the partially cured mixture with a diamine is at a temperature in the range of about 65° to 180° C. for a period of from about 1 to 5 minutes.

10. The process of claim 1 wherein the mixing of a polyoxyalkylene glycol with stoichiometric excess of an organic polyisocyanate is carried out in the presence of a catalyst which is an organic tin compound or a tertiary amine.

11. The process of claim 10 wherein the organic tin compound is stannous octoate.